United States Patent [19]

Coons et al.

[11] 4,014,199
[45] Mar. 29, 1977

[54] APPARATUS AND METHOD FOR PROVIDING AN ELECTRICAL CONTACT WITH A TIP PORTION SUBSTANTIALLY FREE OF BURRS

[75] Inventors: Robert Arthur Coons, Pittsfield; Richard Earl Gipe; Richard Lee Marks, both of Warren, all of Pa.

[73] Assignee: GTE Sylvania Incorporated, Stamford, Conn.

[22] Filed: Jan. 26, 1976

[21] Appl. No.: 652,400

[52] U.S. Cl. .................................. 72/294; 72/302; 72/342
[51] Int. Cl.² ........................................ B21D 31/00
[58] Field of Search .................. 72/294, 302, 342; 225/101; 219/56, 58; 29/630 R

[56] References Cited

UNITED STATES PATENTS

| 2,123,041 | 7/1938 | Hansen | 29/630 R |
| 2,246,931 | 6/1941 | Chiffey | 29/630 R |
| 2,510,788 | 6/1950 | Willett | 225/101 |
| 2,612,063 | 9/1952 | Wangelin | 225/101 |
| 2,679,570 | 5/1954 | Cisne | 219/56 |
| 3,526,957 | 9/1970 | Rohrbach | 29/631 |

FOREIGN PATENTS OR APPLICATIONS

| 469,383 | 11/1950 | Canada | 72/302 |

Primary Examiner—Lowell A. Larson
Attorney, Agent, or Firm—Norman J. O'Malley; Lawrence R. Fraley; Donald R. Castle

[57] ABSTRACT

An apparatus and method for providing an electrical contact with a tip portion substantially free of burrs during the manufacture of said contact. The strip from which the contact is produced is positively engaged at two separate but adjacent locations, heat is applied to a third location between the two, and the two adjacent locations separated a pre-established distance until the third location becomes severed.

17 Claims, 9 Drawing Figures

APPARATUS AND METHOD FOR PROVIDING AN ELECTRICAL CONTACT WITH A TIP PORTION SUBSTANTIALLY FREE OF BURRS

BACKGROUND OF THE INVENTION

The invention relates to the manufacture of electrical contacts. More specifically, the invention concerns providing electrical contacts with tip portions substantially free of burrs during this manufacture.

Previously known methods and apparatus for manufacturing electrical contacts have involved either a forming or a machining operation. The most widely accepted forming operation involved cutting off the strip material at a specified location and thereafter providing the desired end with a proper angle, giving the resulting tip a configuration substantially similar to a truncated pyramid. The best known of the machining operations concerned utilization of a tool similar in operation to a pencil sharpener which positively engaged a severed end of the material to produce a tip having a truncated cone shape.

Both of these known prior art methods contain several disadvantages. Firstly, each requires a substantial amount of operator involvement, primarily for purposes of aligning the various machine components and for maintaining relatively continuous supervision of the process. Such involvement adds to the possibility of human error as well as increasing the opportunity for operator injury. Secondly, these processes have been unable to compensate for any mismatches resulting from variations in both tooling and material tolerances. The result has been the formation of burrs or similar deformities at the critical point of transition from the tapered point to the original cross-sectional configuration of the strip material. Burrs also have occurred at the severed location.

It is believed therefore that an apparatus and method capable of providing an electrical contact produced from a strip of metallic material with a tip portion substantially free of burrs would constitute an advancement in the art.

OBJECTS AND SUMMARY OF THE INVENTION

It is therefore a primary object of the present invention to enhance the electrical contact manufacturing art.

It is a further object of this invention to provide a method for producing an electrical contact having a tip portion substantially free of burrs.

It is a still further object of this invention to provide an apparatus capable of providing this method.

In accordance with one aspect of the present invention, there is provided a method adapted for providing an electrical contact with a tip portion substantially free of burrs. The method comprises engaging the metallic strip from which the contact is made at a first location, engaging it further at a second location adjacent the first, and then applying heat to a third location between the two. The first and second locations are then separated a pre-established distance during which the described third location is elongated and its cross-sectional area reduced. The third location becomes severed completely and thus defines the tip portion of the electrical contact.

According to another aspect of the invention, an apparatus is provided which is capable of accomplishing the above-described method. The apparatus comprises means for engaging the metallic strip material at a first location, means for engaging it at a second location adjacent the first, means for heating a third location between the two locations, and means for effecting separation of the first and second locations to cause elongation of the third location as a reduction in its cross-sectional area. This separation further serves to completely sever the third location, thus defining the contact's new tip portion.

DETAILED DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
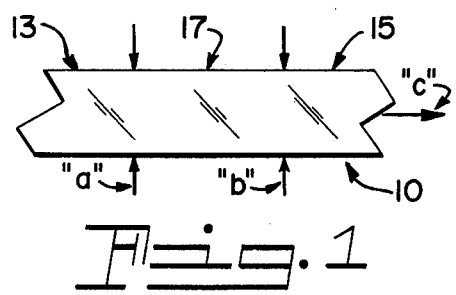
FIGS. 1–3 represent the preferred method of the present invention.
Figure 2:
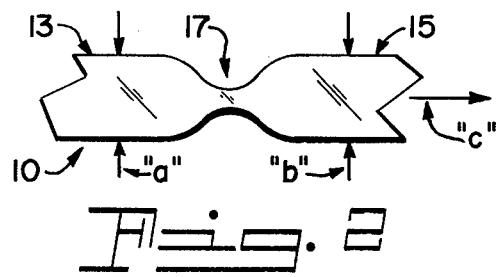
Figure 3:
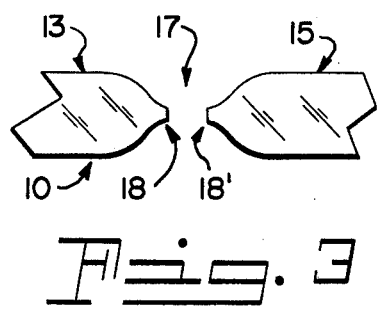

With particular reference to the drawings, FIGS. 1–3 illustrate the preferred method of the present invention. As has been described, the present invention concerns providing an electrical contact with a tip portion substantially free of burrs. Typical of most processes for producing electrical contacts, the contact is produced from an elongated strip 10 of metallic material. This material is preferably of a substantially uniform cross-sectional area. With particular regard to the present invention, a preferred cross-sectional configuration for strip 10 is square in shape with each side approximately 0.025 inches long. It is fully understood that other configurations for the cross-section of strip 10 could be successfully utilized with the present invention. Configurations such as round, hexagonal, octagonal, rectangular, etc. could be used. Accordingly, the use of a substantially square material for strip 10 in the present invention is not meant to restrict the broad concept of the invention.

As evidenced in FIGS. 1–3, strip 10 is positively engaged on opposing sides by a retention force $a$ at a first locaton 13. The strip 10 is further positively engaged on opposing sides by a retention force $b$ at a second location 15 substantially adjacent first location 13. With strip 10 engaged at first and second locations 13 and 15 respectively, a tensile force $c$ is exerted on location 15 in the direction indicated away from first location 13. It is understood, however, that tensile force $c$ as applied at this time (in FIG. 1) does not affect the overall configuration for strip 10. As will be understood, this force could be exerted at another time in the method of the invention and the optimal results still achieved.

With the first and second locations positively engaged and tensile force $c$ exerted as indicated, heat is applied to a third location 17 on strip 10. As shown in FIG. 1, third location 17 is substantially between first and second locations 13 and 15 respectively. Once heat has been sufficiently applied to third location 17, the material at this location weakens and its resistence to the tensile force c applied at second location 15 is substantially reduced. Accordingly, a "necking down" results at third location 17, as illustrated in FIG. 2. It can further be appreciated that the tensile force exerted on second location 15 could have been applied after heat was applied to third location 17 and the same desired results attained. Application of the tensile force prior to heat application is desired in the present invention however to facilitate use of the apparatus to be described in FIGS. 5–9.

In FIG. 3 is shown the end result of the separation of first and second locations 13 and 15. As shown therein, third location 17 has been completely severed thus completely separating first and second locations 13 and 15. Accordingly, the resulting two end portions 18 and 18' can each serve to define a tip portion for an electrical contact. Thus it can be seen that the present invention provides two distinguishing tip portions (one for each electrical contact) should the contacts produced by strip 10 be arranged in an end-to-end relationship. In the simplest form of the invention however, it can be seen that a method has been described for providing a singular electrical contact with a singular tip portion. In this regard, tip portion 18', comprising a part of second location 15, is simply discarded. When using the end-to-end relationship described above however, tip portion 18' represents a defined tip portion should second location 15 be utilized with a second electrical contact.

The end configuration for tip portion 18 (and 18') is substantially free of burrs and thus represents a significant improvement in the maufacture of electrical contacts. As described previously, the known methods for providing electrical contacts with tip portions resulted in these tip areas having undesirable burred configurations. Such burrs occurred primarily at the transition locations between the original uniform cross-sectional area of the strip and the neck down portion. Burrs also frequently occurred at the end of the tip.

Thus, the desired tip portion 18 for an electrical contact produced from metallic strip 10 is accomplished by separating the first and second locations on the strip a pre-established distance to elongate a third location and reduce the cross-sectional area thereof. This reduction is accomplished until the third location becomes completely severed, thus completely separating the described first and second locations. The end result is a tip location substantially free of burrs, thus permitting immediate use of the electrical contact produced therefrom within an insulative housing or other type component.

Figure 4:
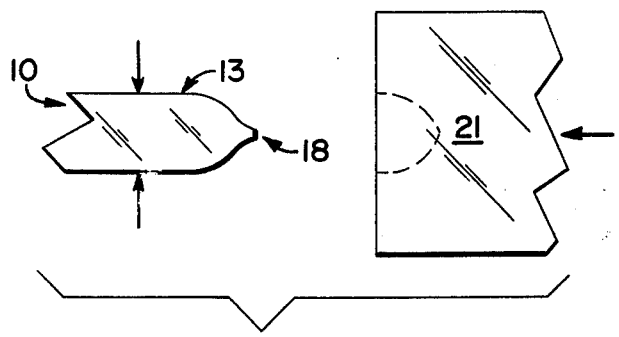
FIG. 4 represents a secondary process for use with the preferred method of FIGS. 1–3.

In FIG. 4 there is shown a secondary operation for use with the preferred method described above in FIGS. 1–3. This secondary process involves a striking or similar operation against the remaining tip portion 18 to provide said tip portion with a second configuration. It is understood, however, that the configuration for the tip as illustrated in FIG. 3 is satisfactory for future contact use. However, the process illustrated in FIG. 4 is provided solely for the purpose of providing a means whereby an additional finished configuration can be achieved. The secondary process is accomplished by engaging tip portion 18 with a striking member 21 moving in the direction illustrated. The preferred finished shape for tip 18 is shown by hidden lines within member 21, said hidden lines representing a depression or similar indentation within member 21.

The finished shape is achieved by compressing tip portion 18 during the described striking motion. Accomplishment of this second configuration is further facilitated by the fact that tip portion 18 remains heated during the striking movement. Thus, compression of the material at this location is enhanced. It is understood however that the tip portion illustrated in FIG. 4 can be cooled prior to the described secondary striking operation.

It is further understood with regard to the present invention that the parameters for the forces and heat applied and the characteristics of the strip material are critical. As stated, the material for strip 10 is preferably metallic. It is further preferred that this metallic material be a copper alloy comprising at least 55 percent by weight copper. It is further understood that other metallic materials can be successfully used in the present invention. However, copper alloy materials are preferred due to their high electrical conductive and oxidation resistance properties.

The preferred copper alloys are selected from the group consisting essentially of brass, Phosphor-bronze, cupronickel, and nickel silver. By brass is meant any copper alloy having a quantity of zinc therein. The preferred brasses utilized in the present invention consist essentially of about 61 to about 95 percent by weight copper. The corresponding amount of zinc within this alloy ranges from about 4 to about 37 percent by weight. With regard to the present invention, brasses including lead are also acceptable. Such brasses include approximately 1 to 2 percent lead therein. The term brass is also meant to include the known tin brasses, such composites having the described copper and zinc components in addition to tin within the range of from about 0.5 to about 2 percent by weight.

Phosphor bronzes are well known in the art as consisting essentially of from about 89 to about 98.8 percent copper, from about 1.25 percent to about 8 percent tin, and additional components. Such components may include phosphorous from about 0.06 to about 2 percent by weight. The term Phosphor bronze is also meant to include lead bearing bronzes which consist essentially of about 89 percent copper, 4 percent lead, 4 percent tin and 3 percent zinc. All of the percentages defined in this specification are by weight.

By cupronickel is meant the copper alloys having about 88 percent by weight copper, from about 9 to about 10 percent by weight nickel, and either iron (at about 1.4 percent by weight) or tin (at about 2.3 percent by weight).

Copper alloys known in the art as nickel silver alloys are also acceptable for the use in the present invention. Nickel silvers include from about 55 to about 72 percent copper, from about 10 to about 29 percent by weight zinc, and from about 8 to about 18 percent by weight nickel. Leaded nickel silvers also include approximately 2 percent by weight lead therein in addition to the above components and are also acceptable for the present invention.

It is fully understood that the above described metallic materials represent those which are preferred for use in the present invention. It is also understood that other metallic compositions may be successfully used with the present invention and successful results achieved therefrom. Thus the ranges provided for the various acceptable copper alloys is not meant to restrict the present invention in any manner.

When using the preferred material described above, a total differential separating force within the range of about 100,000 to about 225,000 pounds/inch$^2$ of the metallic material is applied. This is preferably achieved by fixedly positioning first location 13 and thereafter applying this total differential separating force to second location 15 in the direction indicated in FIG. 1. It is understood however that tensile forces could be applied in opposing directions at first and second locations 13 and 15, respectively, with it only necessary that the differential between the two opposing forces be within the range described above.

Heat application at third location 17 is preferably achieved utilizing electrical resistance heating. This process will be further described with the description of FIGS. 5-9. When applying heat to third location 17, it is preferred to heat the metallic contact material above the yield point of this material. The range above the yield point is commonly defined in the metallurgical art as the material's plastic range and deformation resulting from elongation of a material within this range becomes substantially permanent. Therefore, any new shape derived from said deformation is substantially retained.

When heating metallic material 10 above the yield point of said material, and when using a material having the cross-sectional area illustrated, it is preferred to heat third location 17 for a time period of from about 7 to about 15 milliseconds. It has been determined that this relatively brief period is fully satisfactory to provide the results desired. It can be seen therefore that the process of the present invention is particularly adaptable to mass production manufacturing.

The yield strengths for the metallic materials to be used with the present invention are preferably within the range of from about 59,000 to about 100,000 lbs/inch$^2$. When using this type of material, in addition to utilization of the previously described parameters, a total cross-sectional reduction for severed third location 17 is preferably within the range of from about 75 to about 90 percent. That is, the cross-sectional area at the end of third location 17, that being end 18, is within the range of from about 10 to about 25 percent of the original substantially uniform cross-sectional area for metallic strip 10. This relatively smaller cross-sectional area is also of substantially the same configuration as that for original strip 10. Accordingly, when necking down a square material having 0.025 inch sides, the end configuration will also be substantially square. This relationship (end configuration substantially identical to original configuration) holds true regardless of the overall cross-sectional configuration for the original metal strip 10. Accordingly, a round strip 10 will also produce a substantially round severed end for end location 18 and so forth.

With particular reference to FIGS. 5-9, there is illustrated an apparatus 31 for providing an electrical contact with a tip portion substantially free of burrs. As described, the contact is produced from an elongated strip 10 of metallic material, this strip having a substantially uniform cross-sectional area. Apparatus 31 comprises means 33 for positively engaging strip 10 at a first location 13, means 35 for positively engaging strip 10 at a second location 15, means 37 for heating the metallic strip at a third location 17 between the first and second locations, and means 39 for separating the first and second locations of the strip a predetermined distance in order that elongation, reduction, and severance of the third location can be accomplished.

Figure 5:
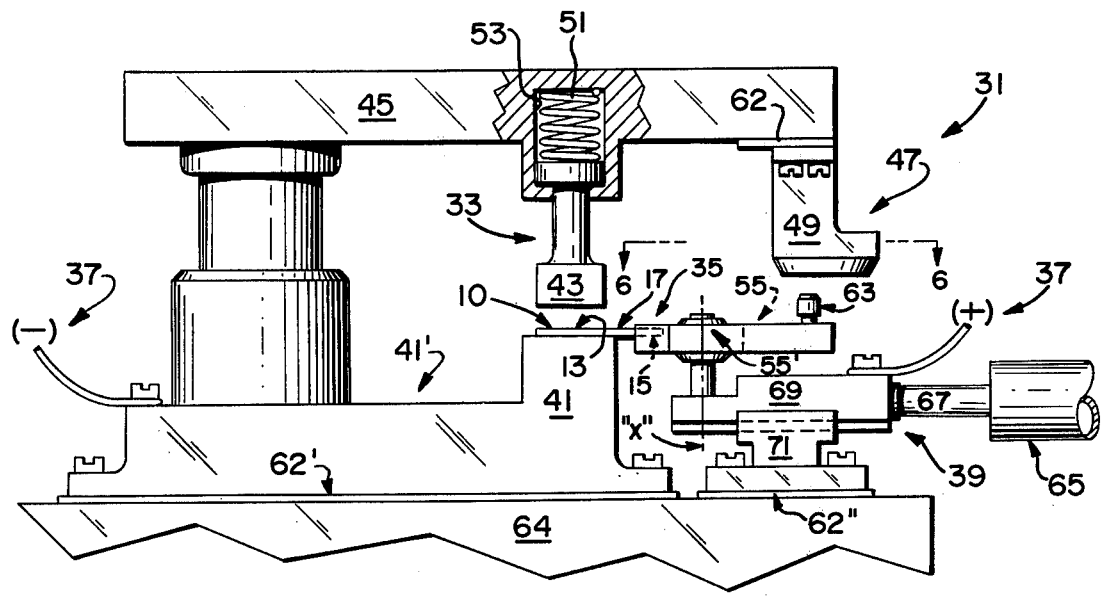
FIG. 5 is a side elevational view illustrating one embodiment of an apparatus of the present invention.

Means 33 preferably comprises a base member 41 adapted for having strip 10 positioned thereon. Means 33 further comprises a movable clamping member 43 for positively engaging the strip positioned on base 41. As shown in FIG. 5, base 41 comprises a part of a substantially larger base member 41'. Furthermore, clamping member 43 is movably retained within upper arm 45 of apparatus 31. Arm 45 is adapted for moving toward and away from base 41' in the manner indicated. This movement is accomplished by utilization of an externally located hydraulic means which is operatively connected to arm 45 for providing movement thereto. Hydraulic systems capable of providing this function are well within the scope of the art and therefore further description is not believed necessary. When arm 45 is actuated toward base 41', clamping jaw 43 moves to positively engage strip 10 at first location 13. This engagement is better illustrated in FIG. 7. An actuating means 47, preferably comprising an extending movable engagement arm 49 affixed to upper arm 45, is also utilized and moves in a direction substantially toward base 41'.

To prevent deformation of strip 10 upon engagement by clamping member 43, it is preferred to spring-load member 43 within arm 45. This is achieved by including a spring 51 within a recessed portion 53 of arm 45. Spring 51 acts in the manner indicated against clamping member 43. As member 43 engages strip 10, the spring force exerted against this member is substantially increased. This force is sufficient to retain strip 10 in the location desired while still assuring that deformation of the strip does not occur.

Figure 6:
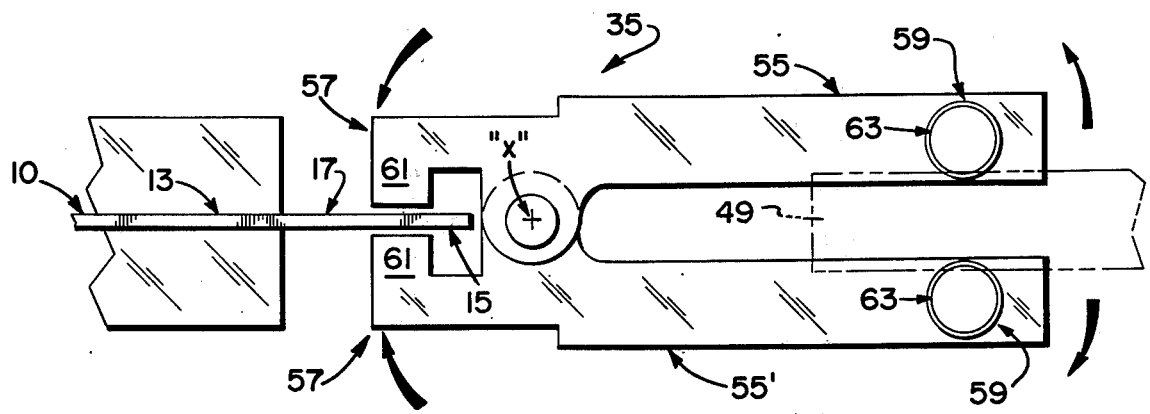
FIG. 6 is a plan view as taken along the line 6—6 in FIG. 5.
Figure 8:
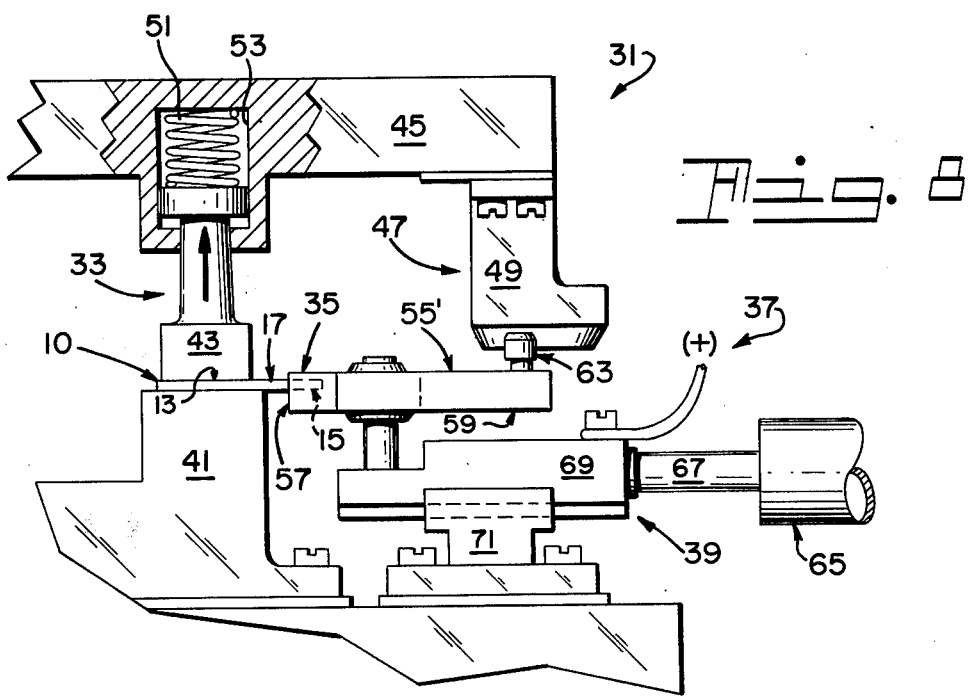

With particular reference to FIGS. 5 and 6, means 35 is illustrated as comprising at least two clamping members 55 and 55' pivoted about a common axis x. Each of the clamping members 55 and 55' have first and second end portions 57 and 59 located on opposing sides of the respective clamping members from the common pivot axis x. Each of the first portions 57 include a jaw portion 61 for engaging strip 10 on opposing sides thereof. Accordingly, engagement arm 49 is adapted for engaging each of the second end portions 59 of the clamping members to provide separation thereof. This separation in turn causes jaw portions 61 to engage strip 10. The end positioning of engagement member 49 to achieve this separation is illustrated in FIG. 8. To facilitate separation of members 55 and 55', it is preferred to provide each of the second end portions 59 with an upstanding follower member 63.

The preferred described method for heating third location 17 of metallic strip 10 is through utilization of electrical resistance heating. This is achieved by providing a means 37 for conducting electrical current through third location 17 of strip 10. When using all electrically conductive components for apparatus 31, this conduction of electrical current may be readily achieved by simply maintaining the second location of the strip (through means 35) at a first electrical potential and the first location (through means 33) at a second electrical potential negative with respect to the first electrical potential. This relationship is illustrated in FIG. 5 by the provision of a pair of conductive leads electrically connected to base 41' and means 39. In the simplest form of the invention, the respective electrical potentials could be achieved by simply electrically connecting the illustrated leads to a source of electrical potential.

With the components above being electrically conductive, it is necessary to insulate means 47 from arm 45. This is achieved by electrically providing insulation 62 between these members at the location designated in FIG. 5. Base 41' and member 71 (to be described) are also preferably insulated using insulation 62' and 62" respectively. This precaution is necessary when using a table 64 of electrically conductive material, e.g. metallic, for apparatus 31.

Means 39 for separating first and second locations of strip 10 preferably comprises an hydraulically actuated motion means which is operatively connected to means 35. A preferred component for this hydraulically actuated means is an air cylinder 65 having an extending movable arm member 67 which is joined to a sliding base member 69. Base member 69 is adapted for sliding within a positioned housing 71 in a direction toward and away from base 41'. It can further be seen that the pivoted clamping members 55 and 55' are pivotedly positioned within an end of sliding base 69. Thus when base 69 moves substantially away from base 41', followers 63 of clamping members 55 and 55' ride on engagement arm 49.

Figure 9:
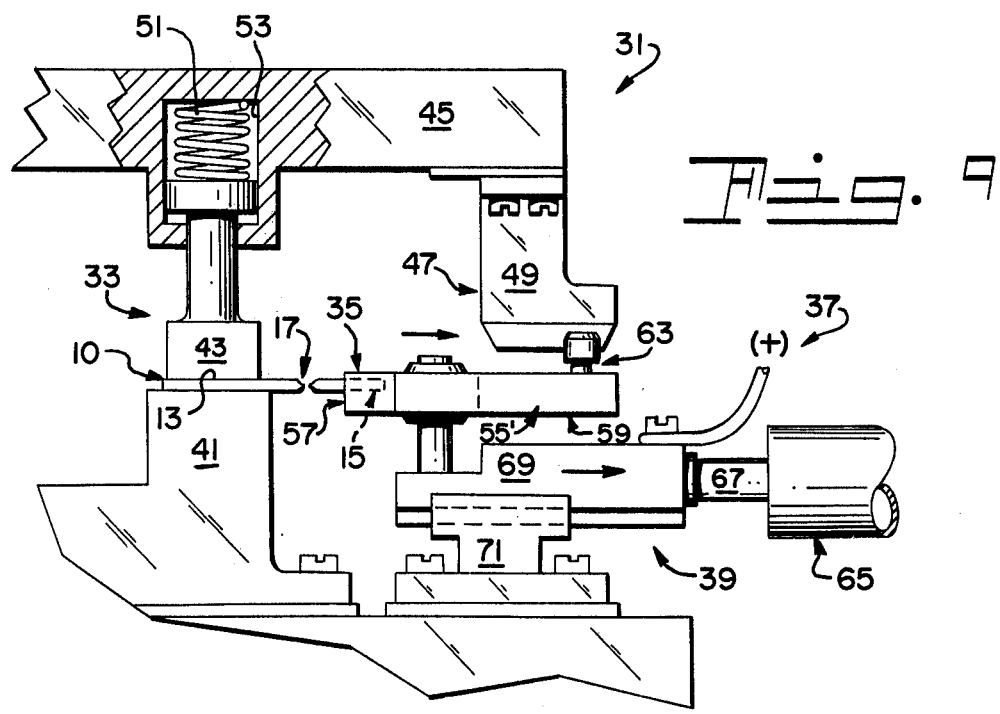
FIGS. 7–9 illustrate the preferred sequences of operation of the apparatus of FIG. 5 for accomplishing the method of the invention.
Figure 7:
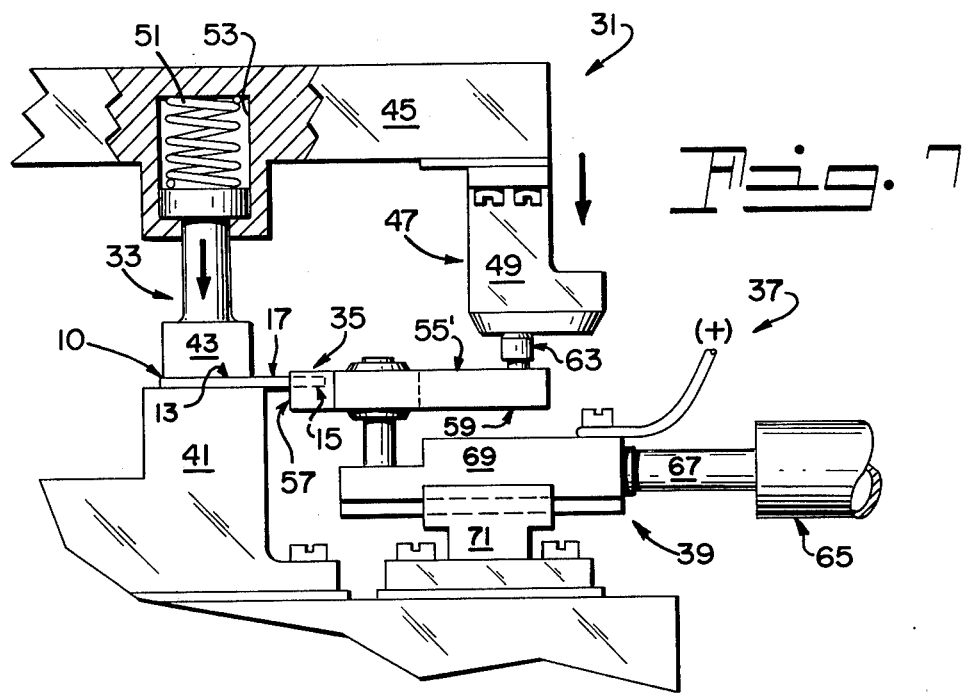

The sequences depicted in FIGS. 7–9 illustrate the various positioning relationships of apparatus 31 during the clamping and separation of strip 10. As previously described in FIGS. 1–3, separation and severance is achieved by first clamping the strip 10 at the first and second locations and thereafter providing the described differential separating force against the means 35 for engaging the strip at the second location. This force is not sufficient to overcome the spring-loaded force on the retained first location nor is it sufficient to deform the strip in any manner. Once heat is applied to the third location by actuation of the described electrically conductive means, separation will occur until the point of severance is achieved.

The actuation of air cylinder 65 to move base 69 in the direction indicated is preferably accomplished by hydraulic means. Such means, similar to those for actuation of arm 45, are well known in the art and further description is not believed necessary.

Thus there has been shown and described an apparatus and method for providing an electrical contact with a tip portion substantially free of burrs. The resulting burr-less configuration is achieved in an expeditious manner which does not necessitate a number of secondary operations.

While there has been shown and described what at present considered the preferred embodiments of the invention, it will be obvious to those skilled in the art that various changes and modifications may be made therein without departing from the scope of the invention as defined by the appended claims.

We claim:

1. A method of providing an electrical contact with a tip portion substantially free of burrs wherein said contact is produced from an elongated strip of metallic material having a substantially uniform cross-sectional area, said method comprising:
    positioning said metallic strip on a base member;
    clamping said metallic strip positioned on said base member at a first location with a movable clamping member;
    clamping said metallic strip at a second location substantially adjacent said first location with at least two clamping members pivoted about a common axis, each of said clamping members having first and second end portions located on opposing sides of said clamping members from said common pivot axis, said first end portions of each of said clamping members including a jaw portion for engaging said strip, said clamping achieved by engaging each of said second end portions of said clamping members with a movable engagement arm to provide separation thereof causing said jaw portions to engage said strip;
    heating said metallic strip to an established temperature for a predetermined time period at a third location substantially between said first and second locations; and
    withdrawing said movable clamping members away from said base member to separate said first and second locations of said metallic strip a pre-established distance to elongate said heated third location and reduce the cross-sectional area thereof until said third location is completely severed, said severed third location defining said tip portion of said electrical contact.

2. The method according to claim 1 wherein said heating of said third location is accomplished by electrical resistance heating.

3. The method according to claim 1 including a secondary shaping step to provide said severed tip portion with a desired second configuration.

4. The method according to claim 1 wherein separation of said first and second locations is accomplished by applying a total differential separating force between said first and second locations within the range of from about 100,000 to about 225,000 pounds per square inch of said metallic material.

5. The method according to claim 4 wherein said established temperature to which said metallic material is heated is above the yield point of said metallic material.

6. The method according to claim 5 wherein said predetermined time period during which said third location of said metallic material is heated is within the range of from about 7 to about 15 milliseconds.

7. The method according to claim 6 wherein said metallic material has a yield strength within the range of from about 59,000 to about 100,000 pounds per square inch.

8. The method according to claim 7 wherein the end cross-sectional area of said reduced and severed third location is within the range of from about 10 to about 25 percent of said substantially uniform cross-sectional area of said metallic strip.

9. The method according to claim 8 wherein said metallic material of said strip is a copper alloy comprising at least 55 percent by weight copper.

10. The method according to claim 9 wherein said copper alloy is selected from the group consisting essentially of brass, Phosphor bronze, cupronickel, and nickel silver.

11. An apparatus for providing an electrical contact with a tip portion substantially free of burrs wherein said contact is produced from an elongated strip of metallic material having a substantially uniform cross-sectional area, said apparatus comprising:
    means for positively engaging said metallic strip at a first location, said means comprising a base member for having said strip positioned thereon and a movable clamping member for positively engaging said strip when said strip is positioned on said base member;

means for positively engaging said metallic strip at a second location substantially adjacent said first location, said means comprising at least two clamping members pivoted about a common axis, each of said clamping members having first and second end portions located on opposing sides of said clamping member from said common pivot axis, said first end portions of each of said clamping members including a jaw portion for engaging said strip;

means for actuating said pivoted clamping members comprising a movable engagement arm for engaging each of said second end portions of said clamping members to provide separation thereof, said separation causing said jaw portions to engage said strip;

means for heating said metallic strip to an established temperature for a predetermined time period at a third location substantially between said first and second locations; and means for separating said first and second locations of said metallic strip a pre-established distance to elongate said third location and reduce the cross-sectional area thereof until said third location is completely severed, said severed third location defining said tip portion of said electrical contact.

12. The apparatus according to claim 11 wherein said means for heating said third location comprises means for conducting electrical current through said third location.

13. The apparatus according to claim 11 wherein said means for separating said first and second locations comprises an hydraulically actuated motion means operatively connected to said means for engaging said second location.

14. The apparatus according to claim 11 wherein said movable clamping member is spring-loaded.

15. The apparatus according to claim 12 wherein said means for conducting electrical current through said third location of said strip comprises means electrically connected to said pivoted clamping members for establishing said second location at a first electrical potential and means electrically connected to said base member for establishing said first location at a second electrical potential negative with respect to said first electrical potential.

16. The apparatus according to claim 13 wherein said hydraulically actuated motion means comprises an air cylinder having a movable extending arm member joined to said means for engaging said second location.

17. The apparatus according to claim 11 further including means for providing said severed tip portion with a second configuration.

* * * * *